United States Patent [19]

Nagata

[11] Patent Number: 4,558,900
[45] Date of Patent: Dec. 17, 1985

[54] VEHICULAR SEAT

[75] Inventor: Masanori Nagata, Kasugai, Japan

[73] Assignee: Toyoda Gosei Co., Ltd., Nishikasugai, Japan

[21] Appl. No.: 584,384

[22] Filed: Feb. 28, 1984

[30] Foreign Application Priority Data

Feb. 28, 1983 [JP] Japan .................................. 58-29524

[51] Int. Cl.$^4$ .............................................. B60J 5/00
[52] U.S. Cl. ...................................... 296/152; 296/63; 297/458
[58] Field of Search ................. 296/63, 146, 153, 152; 297/217, 458

[56] References Cited

U.S. PATENT DOCUMENTS 3,808,743  5/1974  Renner et al. ...................... 296/153
3,907,358  9/1975  Barenyi et al. ...................... 296/146
4,231,607 11/1980  Bohlin ................................... 296/63

Primary Examiner—Robert R. Song
Attorney, Agent, or Firm—Cushman, Darby & Cushman

[57] ABSTRACT

A vehicular seat provided on both sides with side support members for preventing a passenger from tilting during vehicular turning and thereby protecting the passener, is disclosed. Of those side support members, the side support member on the side of a door is formed integrally with the door at a lower inside portion of the door, while the side support member on the vehicle-room center side is formed by upwardly extending a side end portion on the same side of a seat cushion of the seat. The side support member on the side opposite to the door may be substituted by a console box mounted on the floor along the seat cushion.

4 Claims, 4 Drawing Figures

VEHICULAR SEAT

BACKGROUND OF THE INVENTION

The present invention relates to a vehicular seat and more particularly to a vehicular seat provided with side support members for the occupant or passenger on both sides of a seat cushion.

As a vehicular seat there has been known a seat which is provided with side support members on both sides of a seat cushion in order to improve the retainability for the passenger's body during vehicular running, especially during turning.

In a conventional seat shown in FIG. 1, a seat 1 comprises a seat cushion 2, a seat back 3 and a head rest 4. Both sides of the seat cushion 2 supported on a floor 5 rise to form side support members 20a and 20b.

By the formation of the side support members 20a and 20b, the passenger on the seat is prevented from tilting and the retainability for the passenger's body is improved during vehicular running, especially during turning. On the other hand, however, the side support member 20a on the side of a door 6 is a hindrance to getting in and out of the vehicular room or passenger compartment. It may be a solution to this problem to make the seat rotary, but in this case not only the seat supporting structure becomes complex but also it is necessary to provide a wider seat mounting space.

SUMMARY OF THE INVENTION

An object of the present invention is to provide a vehicular seat having side support members at both side portions thereof, of which the side support member on the door side is not a hindrance to getting in and out of the vehicular room.

In the present invention, side support members are formed on both sides of a seat cushion, of which the side support member on the side of a door is formed integrally with the door at a lower inside portion of the door. The other side support member on the central side of the vehicular room is formed by extending a side end portion of the seat cushion in a rising direction. It may be substituted by a console box which is mounted on the central side of the vehicular room in close contact with the above side end portion of the seat cushion.

DESCRIPTION OF THE PREFERRED EMBODIMENTS

The present invention will be described hereinunder on the basis of its embodiments illustrated in the accompanying drawings.

Figure 1:
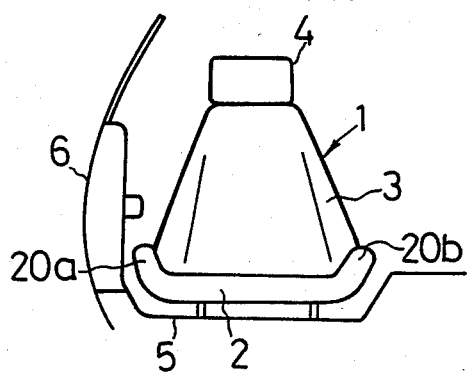
FIG. 1 is a front view of a conventional driver's seat in a vehicle.
Figure 2:
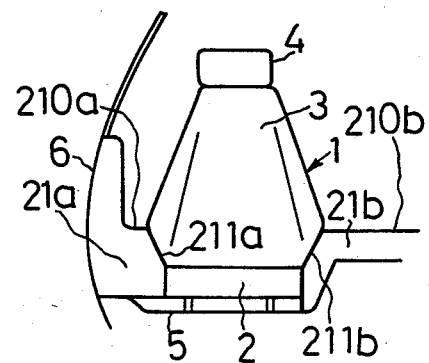
FIG. 2 is a front view of a driver's seat according to a first embodiment of the present invention.
Figure 3:
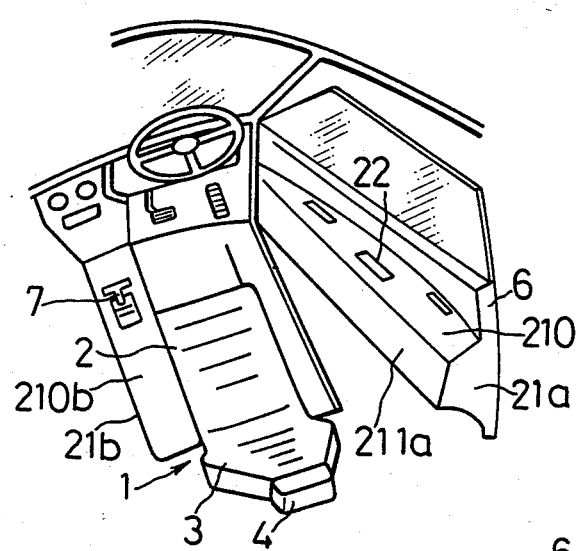
FIG. 3 is a top view thereof.

Referring to FIGS. 2 and 3, there is illustrated a first embodiment of the present invention, in which a lower inside portion of a front door 6 of a vehicle expands in the inside direction of the vehicle room to form a side support member 21a which has a shelf-like upper surface 210a projecting in the inside direction of the vehicle room and a side wall 211a extending along the lower side face of a seat 1. The upper surface 210a is positioned in a height above a seat cushion 2 and suitable for its utilization as an arm rest. The side support member 21a, which is formed integrally with the door 6, is internally packed with a cushioning material (not shown) such as urethane foam and is covered with a covering material common to the upper inside portion of the door 6. In the interior of the side support member 21a there may be formed an air bag for adjusting the bodily form. In the upper surface 210a of the side support member 21a is formed a recess 22 which serves as a grip for opening and closing the door. The width of the lower portion of the side support 21a is set so that its side face comes into close contact with the side face of the seat cushion 2 opposed thereto when the door is closed.

On the other hand, on the room center side of the seat 1 is mounted on a floor 5a console box 21b which serves also as another side support member. The console box 21b has an upper surface 210b positioned higher than the seat cushion 2 and a side face 211b on the side of the seat 1 which side face is symmetric in shape with respect to the side wall 211a of the side support member 21a on the door side. The lower portion of the side face 211b is in close contact with the side end face of the seat cushion 2 opposed thereto. The console box 21b is integrally packed with a cushioning material (not shown), and from its upper surface there projects a shift lever connected to a transmission (not shown).

Figure 4:
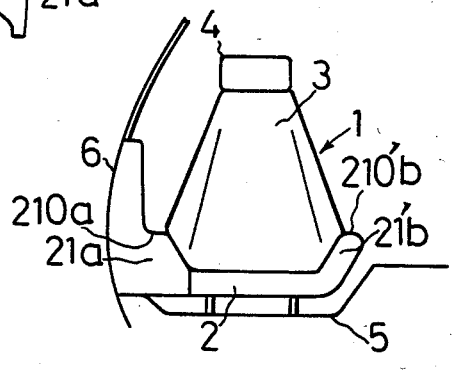
FIG. 4 is a front view of a driver's seat according to a second embodiment of the present invention.

Referring now to FIG. 4, there is illustrated a second embodiment of the present invention, in which a side support member 21'b on the central side of the vehicle room is formed by upwardly extending one side end portion of a seat cushion 2 in the same fashion as in the foregoing prior art. The height of its upper end face 210'b is substantially the same as that of an upper surface 210a of a side support member 21a on the door side. The structure of the side support member 21a is the same as in the above first embodiment.

In the present invention, as set forth hereinabove, the side support member on the door side is formed integrally not with a seat cushion but with a door, so it is not a hindrance to getting in and out of the vehicle room because the door is opened. During vehicular running, the door is closed and the side support member integral with the door is positioned at a side of the seat cushion, thus functioning to protect the passenger's body in just the same manner as in the side support member formed integrally with the seat cushion. Further, since the gap between the side portion of the seat and the door is blocked up with the side support member integral with the door, small articles are prevented from falling in the said gap. Additionally, the side support member can serve also as a door arm rest.

What is claimed is:

1. A vehicular seat provided with a seat cushion and having side support members for the occupant respectively on door side and vehicle-room center side of the seat, the side support member on the door side being formed integrally with a door at a lower inside portion thereof and having a shelf-like upper surface projecting inward of the vehicle room above the seat cushion and a side surface depending from the inner edge of said upper surface downward to the corresponding side of the cushion, and the side support member on the vehicle-room center side having an upper surface positioned at substantially the same height as said upper surface of the side support member on the door side.

2. A vehicular seat according to claim 1, wherein the lower portion of said side surface of said side member on the door side comes into close contact with the side of said seat cushion.

3. A vehicular seat according to claim 1, wherein the side support member on the vehicle-room center side is formed by extending an end portion on the vehicle-room center side of said seat cushion in a rising direction so that its upper end surface is positioned at substantially the same height as said upper surface of the side support member on the door side.

4. A vehicular seat according to claim 1, wherein the side support member on the vehicle-room center side comprises a console box mounted on the floor along and in close contact with the corresponding side of said seat cushion.

* * * * *